Aug. 21, 1962 C. W. COCHRAN 3,050,097
SNAP-IN BOLT RETAINER
Filed Oct. 22, 1959
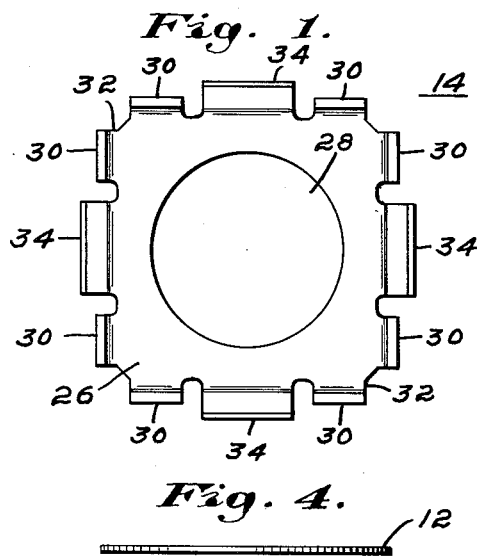
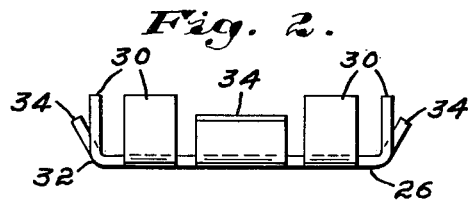
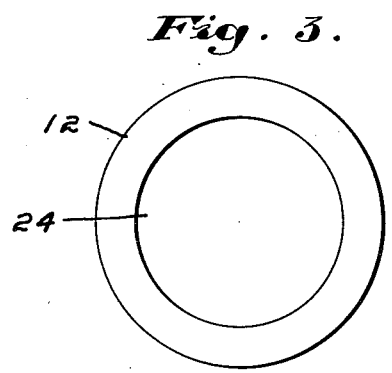
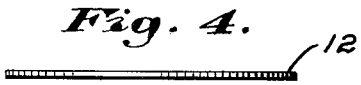
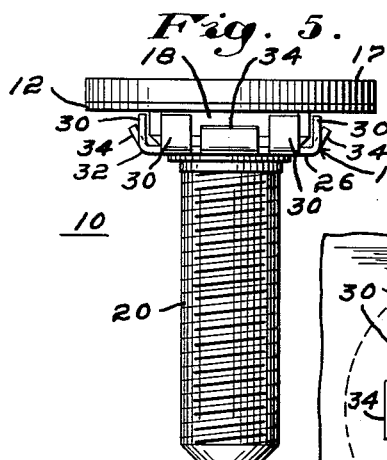
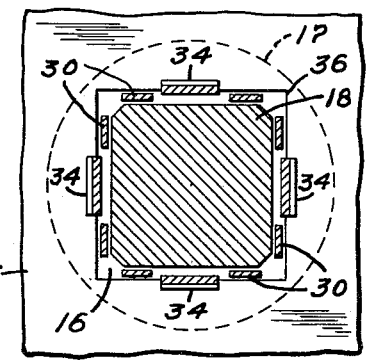
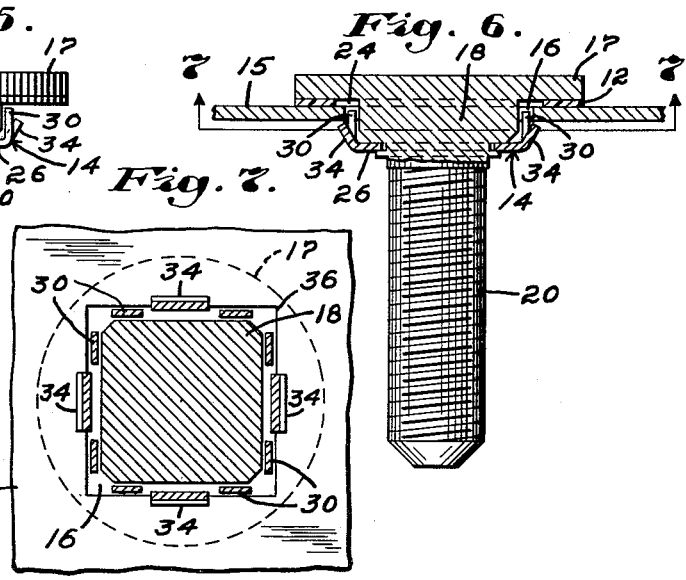
Inventor:
Clarence W. Cochran,
by James B. Tiffany Jr. Atty.

United States Patent Office 3,050,097
Patented Aug. 21, 1962

3,050,097
SNAP-IN BOLT RETAINER
Clarence W. Cochran, Belmont, Mass., assignor to United-Carr Fastener Corporation, Cambridge, Mass., a corporation of Delaware
Filed Oct. 22, 1959, Ser. No. 847,934
1 Claim. (Cl. 151—41.75)

This invention relates generally to fastening devices and more specifically to a snap-in bolt assembly for mounting in an apertured panel and aims to generally improve existing devices of this type.

In automotive assemblies or the like it is sometimes desirable in mounting structural panels to mount a bolt or a series of bolts firmly on one panel to facilitate aligning a second panel thereon prior to bolting them together. The present practice is to weld a bolt or a series of bolts to one panel prior to assembling the second panel with resultant misalignment and damage to threads plus injuries to personnel during other assembly line operations. Furthermore, existing devices used in lieu of the welding operation are not watertight, require a large application hole and a bolt-carrying plate spanning the aperture where the head of the bolt is of lesser diameter than the aperture to permit installation.

The object of the invention is to provide a snap-in bolt which is of a simple and economical construction and requires a minimum aperture in the mounting panel.

A further object of the invention is to provide a snap-in bolt, rivet, or the like, where the head of the bolt bears directly on one surface of the mounting panel providing for maximum holding strength between the panels.

Another object of the invention is to provide a snap-in bolt which may be mounted in the panel by axial pressure and which may be removed by a simple tool.

Another object of this invention is to provide a snap-in bolt which locks into an apertured panel on four sides of the aperture and also provides a non-rotatable assembly due to high torquing characteristics.

A further object is to provide a snap-in bolt which may be provided with a sealing structure to prevent ingress of water within the panel.

Further objects of this invention will, in part, be obvious, and will, in part, appear hereinafter.

In the drawings:

FIG. 1 is a top plan view of the bolt retaining member;

FIG. 2 is a view in front elevation of the member shown in FIG. 1;

FIG. 3 is a top plan view of the sealing member;

FIG. 4 is a view in side elevation of the sealing member;

FIG. 5 is a view in side elevation of the snap-in bolt prior to assembly into an apertured panel;

FIG. 6 is a view in section of the snap-in bolt assembled within an apertured panel; and FIG. 7 is a view in section taken on line 7—7 of FIG. 6.

Referring to the drawings there is illustrated a conventional bolt 10 having a sealing member 12 and a bolt retainer 14 secured thereon adapted to secure the bolt to a supporting panel 15 by being snapped into an aperture 16.

The bolt comprises a head 17, a shoulder portion 18 disposed intermediate the head and a threaded shank 20. The sealing member 12 may be of any suitable resilient material and a plastic of the polyvinyl type has proved to be very successful in this type of an application. The seal may be of any desired shape but as illustrated in FIG. 3, the preferred shape is circular having an external diameter substantially the same as the diameter of the head 17. A central aperture 24 of a diameter greater than the shoulder portion 18 of the bolt is formed to allow the sealer to be positioned in circumscribed relation thereto.

The bolt retainer 14 is constructed of flat resilient metal having a base portion 26 with a central aperture 28 formed therein. A plurality of tabs 30 are stuck upward from the periphery 32 of the base portion 26 at substantially right angles thereto creating a configuration conforming generally to the shape of the shouldered portion 18 of the bolt 10 and of sufficient length so as to penetrate through the aperture 16 of the supporting panel 15 for a purpose to be described hereinafter. A series of tangs 34 of lesser overall length than the tabs 30 extend in the same general direction as the tabs 30 and are disposed intermediate the tabs and inclined outwardly away from the central aperture 28.

The snap-in bolt is preassembled prior to installation in the panel by positioning the sealer 12 on the under surface of the bolt head 17 placing the retainer 14 on the shouldered portion 18 and securing it firmly thereto by staking or other means.

The snap-in bolt 10 may then be inserted into the aperture 16 of the panel 15 by a simple axial push in such a manner that the tangs 34 flex inwardly in the direction of the bolt axis to allow passage through the panel and then flex outwardly to cooperate with the undersurface of the panel 15 to retain the bolt in assembly. After the bolt has been snapped into the panel, it will readily be seen from FIG. 6 that the tabs 30 will be positioned adjacent the corner 36 of the aperture 16 so as to allow a minimum amount of rotatable movement of the bolt when torque is applied.

Since certain other obvious modifications may be made in this device without departing from the scope of the invention, it is intended that all matter contained herein be interpreted in an illustrative and not in a limiting sense.

I claim:

A snap-in bolt device comprising a head portion, a polygonal shoulder portion, said shoulder portion being integral with said head, the major traverse dimension of said shoulder being less than the smallest traverse dimension of said head, a threaded shank extending from said shoulder portion, a retainer member and means securing said retainer member to said shoulder portion, said retainer member having an apertured base portion, said threaded shank normally extending through said aperture and a plurality of yieldable tangs integral with said base portion underlying said head portion extending toward and terminating short of said head, inclined from said base portion of said retainer member and in spaced relation to said shoulder portion throughout the length of said tangs, and a series of tabs, integral with said base portion, intermediate said tangs, extending toward and terminating short of said head portion in substantially right angle relationship to said base portion, said tabs together defining a polygonal configuration generally complementary to said shoulder and said tabs having a greater length than said tangs, said tangs adapted to engage an apertured support adjacent the aperture on the side of said support remote from said head portion to retain said bolt device in said support.

References Cited in the file of this patent

UNITED STATES PATENTS

| | | |
|---|---|---|
| 1,725,883 | Recker | Aug. 27, 1929 |
| 2,385,893 | Taylor | Oct. 2, 1945 |
| 2,527,053 | Bedford | Oct. 24, 1950 |
| 2,560,961 | Knohl | July 17, 1951 |
| 2,626,772 | Flora | Jan. 27, 1953 |
| 2,713,186 | Borowsky | July 19, 1955 |
| 2,727,552 | Chvosta | Dec. 20, 1955 |